Figure 1:
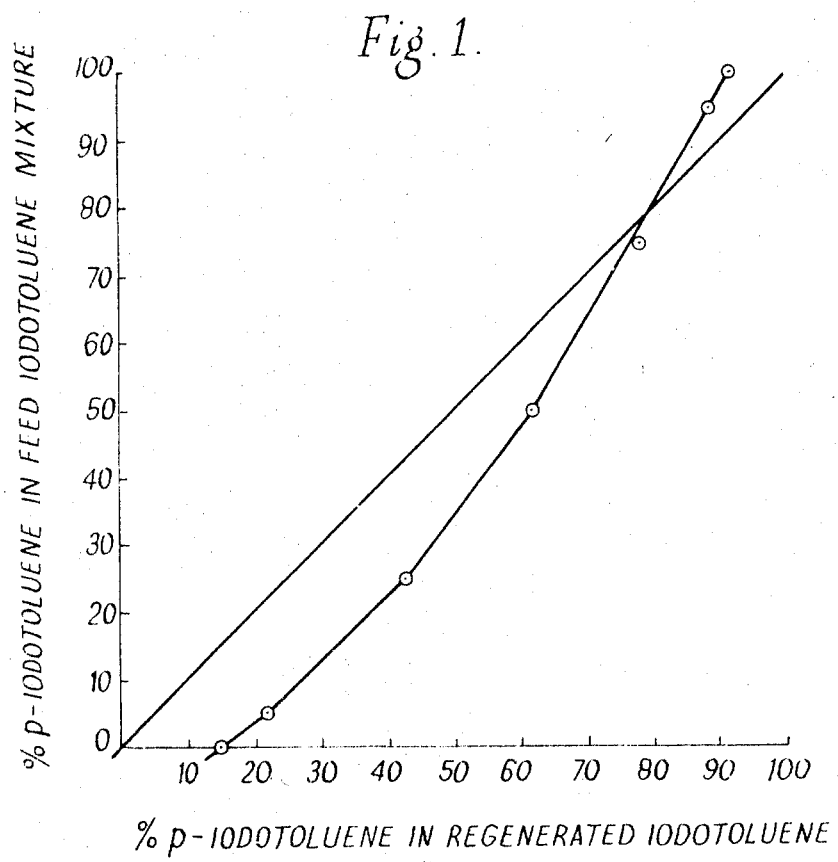
Figure 2:
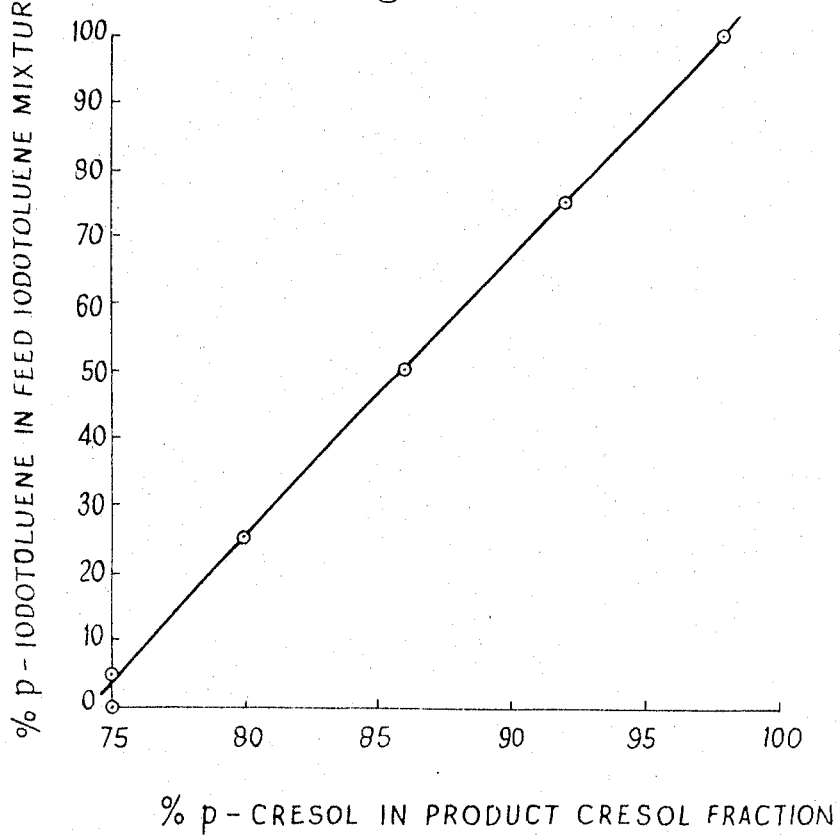

United States Patent Office 3,463,825
Patented Aug. 26, 1969

3,463,825
PROCESS FOR THE PRODUCTION OF SUBSTITUTED AROMATIC COMPOUNDS
David James Le Count and James Angus Wilson Reid, Runcorn, England, assignors to Imperial Chemical Industries Limited, London, England, a corporation of Great Britain
Filed June 13, 1966, Ser. No. 556,953
Claims priority, application Great Britain, July 22, 1965, 31,242/65
Int. Cl. C07c 37/00, 39/06
U.S. Cl. 260—621                                    4 Claims

ABSTRACT OF THE DISCLOSURE p-Cresol is prepared by a continuous cyclic process which involves oxidizing a mixture of o- and p-iodotoluenes to the corresponding iodosotoluenes, condensing such iodosotoluenes with toluene in the presence of a strong acid to form a ditolyl iodonium salt, hydrolyzing the said salt to produce cresol and regenerate iodotoluene, recycling the regenerated iodotoluene, and isolating p-cresol from the product cresol fraction. Once a steady state is achieved, the yield of p-cresol is high.

---

This invention relates to continuous processes for preparing p-cresol from toluene.

The applicants have made an investigation of the series of reactions involved in converting iodotoluene into a ditolyl iodonium salt with toluene (by way of the iodoso derivative of iodotoluene) and decomposing the iodonium cation of the iodonium salt with water so as to form cresol and to regenerate iodotoluene.

General methods for preparing iodonium salts are available from the literature as also are details of reactions, including hydrolysis, which such salts can be caused to undergo. Comprehensive articles by Beringer and coworkers, Sandin and coworkers and Caserio and coworkers appear in the Journal of the American Chemical Society, volumes 75 (at page 2705 et seq. and 2708 et seq.), 78 (at page 3819 et seq.) and 81 (at page 336 et seq., 342 et seq. and 351 et seq.) and those articles should be referred to for general information as well as for details of convenient preparation routes and conditions. The article by Caserio and coworkers in J.A.C.S., vol. 81, at 336—342 contains an especially detailed discussion of the copper (I) catalysed hydrolysis of iodonium cations.

The particular route to iodonium salts with which the present invention is concerned is that involving converting p-iodotoluene into the corresponding iodoso compound by peroxide, for example, organic peracids such as peracetic acid, and reacting this iodoso compound with toluene in the presence of a strong acid (invariably in practice concentrated sulphuric acid). This route is described by Beringer and coworkers and by Sandin and coworkers in the aforementioned articles and the particular method and conditions of the latter workers are preferred by the applicants. Thus, in greater detail, the method preferred by the applicants involves using peracetic acid in an acetic acid/acetic anhydride solvent system as the peroxide for forming the iodoso derivative from iodotoluene. The peracetic acid is best prepared by reaction between acetic anhydride and a 30% w./v. aqueous solution of hydrogen peroxide and can be used as so prepared without isolation. Toluene is incorporated in the solution of the iodoso derivative of iodotoluene and the medium is rendered strongly acid with concentrated sulphuric acid (which is a very efficacious acid for providing suitable conditions for iodonium cation formation as well as being readily available and providing the very weakly nucleophilic bisulphate anion) and the ditolyl iodonium bisulphate is formed. The temperature of the reaction media is kept below about 20° C. throughout. This route obviates any need to isolate either the peracetic acid or the iodoso compound and the iodonium bisulphate solution obtained can quite satisfactorily be used as such for subsequent hydrolysis to form cresol and iodotoluene since neither the bisulphate anion nor the other ingredients are sufficiently powerful as nucleophiles to interfere with the hydrolysis reaction.

Hydrolysis is most conveniently carried out by merely diluting the strongly acid iodonium bisulphate solution obtained as described immediately hereinbefore with an ample quantity of water and boiling the dilute solution under reflux in the presence of cuprous copper (suitably as the chloride) as hydrolysis catalyst for a period (usually 2 to 5 hours) sufficient to effect total decomposition of the iodonium salt. Iodotoluenes and cresols can be extracted from the resultant mixture by ether extraction and cresols can be separated from iodotoluenes by caustic alkali extraction. Uncatalysed hydrolysis of iodonium salts by water occurs very slowly, if at all.

The following is an example of a typical iodonium salt preparation followed by a typical hydrolysis reaction.

To acetic anhydride (100 mls.) at a temperature of 0° C. was added a 30% w./v. aqueous solution of hydrogen peroxide (25 mls.) over a period of 30 minutes. The peracetic acid solution thus formed was stirred until homogeneous. Toluene (50 mls.) and a solution of iodotoluene (10 g.) in acetic anhydride (20 mls.) were mixed with peracetic acid solution so prepared (64 mls.). The mixture was cooled to a temperature of 0° C. and concentrated sulphuric acid (12.5 mls.) was then added dropwise with stirring and the resultant mixture was stirred at room temperature for a period of 15 hrs. Ditolyl iodonium bisulphate was then present in solution.

Water (500 mls.) was added to the strongly acidic salt solution and the diluted solution was first extracted with ether (3×100 mls.), for convenience of later work-up, before refluxing for 3 hrs. in the presence of cuprous chloride (250 mg.). At the end of such period of reflux the iodonium salt had been completely hydrolysed to cresol and iodotoluene. After cooling, the solution was extracted with ether (3×100 mls.), the ether extracts neutralised with sodium bicarbonate and the cresols removed from the ether extract by caustic alkali extraction. Evaporation of the ether extract gave iodotoluenes (8 g.). The alkali extract was rendered acid by concentrated hydrochloric acid and extracted with ether (3×50 mls.). This ether extract was dried and evaporated to yield cresols (4 g.).

In the course of investigating the aforedescribed iodonium salt forming reaction and the hydrolysis of the iodonium salt, it was discovered that the iodotoluene fraction regenerated when pure p-iodotoluene is involved in salt formation contains a significant proportion (~8%) of o-iodotoluene. It is presumed from this that some ortho-para-ditolyl iodinium salt is formed as well as the di(para-tolyl) iodinium salt. A series of cases in which the feed iodotoluene material used for salt formation contained differing proportions of ortho and para iodotoluenes was then studied and the proportions of ortho and para isomers in the regenerated iodotoluene fractions and the product cresol fractions were determined by analysis. The results obtained have been plotted in the accompanying graphs in which graph I shows the percentage of p-iodotoluene in the feed mixture of o- and p-iodotoluenes plotted against the percentage of p-iodotoluene in the regenerated o/p iodotoluene mixtures; and graph II shows the percentages of p-cresol (and o-cresol by difference from 100) in the product cresol fractions for different concentrations of p-iodotoluene in the feed mixture of o- and p-iodotoluenes.

It can be seen from graph I that for feed iodotoluene mixtures containing less than about 79% of p-iodotoluene the regenerated iodotoluene is richer in p-iodotoluene, and for feed iodotoluene mixture containing more than about 79% of p-iodotoluene the regenerated iodotoluene is poorer in p-iodotoluene. A percentage of content of p-iodotoluene in the feed iodotoluene mixture of about 79% represents, therefore, the "equilibrium" value which any system (of whatsoever proportions of o- and p-iodotoluenes in the feed iodotoluene) that involves recycling regenerated iodotoluene fractions will tend towards. From graph II it can be seen that such an "equilibrium" feed gives rise to a cresol fraction containing the surprisingly high amount of 93% p-cresol.

The reactions involved in the aforedescribed sequence of iodonium salt-formation and -hydrolysis are in fact very clean leading to mixtures of ortho and para cresols and ortho and para iodotoluenes little contaminated by other product substances. Even so, in any practical system embodying these reactions, a recovery of iodotoluenes somewhat less than the ideal will be unavoidable and the applicants have continued their investigations and inquired into the effects of making-up different quantities of unrecovered iodotoluene with fresh iodotoluene mixtures of given differing contents of o- and p-iodotoluenes. These investigations have revealed that "steady states" are attainable at which the proportion of p-iodotoluene in successive feeds remains constant (the proportion of p-iodotoluene in successively regenerated iodotoluene fraction then being constant also). It has been found that the characteristics of the system are such that despite an effective loss of iodotoluenes of, say, 10 to 20% a steady state can be arrived at, when such loss is made up by a 50:50 mixture of o- and p-iodotoluene, at which the proportion of para cresol in the product cresol fraction is about 90% or greater.

These results are remarkable and show that a practical route to p-cresol has been discovered which demands, for high yields, no extreme efficiency in iodotoluene recovery techniques nor the use of an iodotoluene especially enriched in p-iodotoluene for feed-bulk maintenance. Mixtures of ortho- and para-iodotoluenes as would be obtained by commercial manufacturing routes would be likely acceptable materials. Further, graph I shows that it is not necessary to begin manufacturing operations with iodotoluene specially enriched in para iodotoluene if a preliminary settling-down period can be accepted during which the composition of the feed iodotoluene will be adjusted to the desired steady state value.

The present invention provides a continuous process for preparing p-cresol which comprises (a) converting toluene and a mixture of o- and p-iodotoluenes into ditolyl iodinium salt containing a weak nucleophilic anion by forming the iodoso derivative of the iodotoluene and reacting such derivative with toluene in the presence of a strong acid such as sulphuric acid (b) hydrolysing the iodonium cation of such salt to form a cresol fraction and an iodotoluene fraction as essentially sole hydrolysis products (c) recovering and recycling the product iodotoluene fraction for use in feed iodotoluene for a repeated sequence of conversion, with fresh toluene, to iodonium salt and hydrolysis of such salt (d) repeatedly recovering and so recycling product iodotoluene (e) attaining a steady state condition at which the proportion of p-iodotoluene in the product and feed iodotoluenes remains substantially constant, the feed then containing at last 60% of p-iodotoluene (resulting in a product cresol fraction containing more than 85% of p-cresol) and (f) isolating p-cresol from the product cresol fraction of such steady state operation.

It will be clear that the aforedescribed preferred or convenient reaction conditions are advantageously employed in the process of the invention.

Advantageously, the iodotoluene used as initial feed contains less than 80% of p-iodotoluene since special enrichment of ortho/para iodotoluene mixtures from commercial sources will then not be necessary. Preferably, the steady state proportion of p-iodotoluene in the feed iodotoluene exceeds 65%. It may suitably be within the range of from 65–75%, e.g. 70–75%.

Advantageously the bulk of the iodotoluene feed is maintained by additions to the recovered product iodotoluene fractions of a mixture of ortho and para iodotoluenes containing at least 50% p-iodotoluene, say 50 to 75 or 80% p-iodotoluene.

Having described the process of the invention and the manner of its performance those who may be concerned with putting the present process into practice might be assisted by a simplified mathematical treatment of the results plotted on graphs I and II. Let $y$ be the percentage content of p-iodotoluene in the feed iodotoluene mixture and $x$ be the percentage content of p-iodotoluene in the resultant product iodotoluene fraction. From graph I it can be seen that, for $y>50$, the curve approximates to the form $$y = 1.66x - 52$$

Let the percentage loss of iodotoluene from each sequence of salt forming and hydrolysis reactions be $a$ (based on the feed) and let the percentage of p-iodotoluene in the ortho/para iodotoluene mixture used for feed bulk maintenance be $m$. Then, $$y_{n+1} = \frac{(100-a)X_n + am}{100}$$

where $y_{n+1}$ is the percentage of p-iodotoluene in the feed made up from the product iodotoluene fraction containing $x_n$ percentage of p-iodotoluene.

At steady state, $y = y_s$ (a constant) and $x = x_s$ (also a constant).

Hence at steady state $$y_s = \frac{(100-a)x_s + am}{100} = 1.66x_s - 52$$

Solving for $y_s$ we obtain $$y_s = \frac{(1.66m - 52)a + 5200}{66 + a}$$

This relationship enables the "steady state" percentage of p-iodotoluene in the feed material to be calculated for any value of $m$, assuming different values of $a$. Some deduced values of $y_s$ for different values of $a$ and $m$ are given in the table as also are the percentage contents of p-cresol in the cresol fractions which graph II shows result from feeds of such p-iodotoluene contents.

TABLE

| a | m | $y_s$ | Percent p-cresol content in cresol product |
|---|---|---|---|
| 0 | -- | 79 | 93 |
| 5 | 50 | 75 | 92 |
| 10 | 50 | 72–73 | 91 |
| 20 | 50 | 67.5 | 90 |

The following examples illustrate the invention.

A cyclic sequence of reactions was carried out involving preparation of iodonium salt, hydrolysis thereof, and recycle of product regenerated iodotoluene fraction (with loss made-up by addition of fresh iodotoluene mixture) for repeated iodonium salt formation and hydrolysis.

A mixture of ortho- and para-iodotoluenes (5.0 g. of

79% para content) was used for iodonium salt formation. The mixture was dissolved in glacial acetic acid (10 mls.) and 20% paracetic acid solution in acetic acid (25 mls., 0.065 mole) was added slowly at room temperature. After standing overnight, toluene (25 ml.) was added and the mixture was stirred vigorously at a temperature of 0 to 10° C. whilst 98% suphuric acid (6.3 mls., 0.12 mole) was added dropwise. Stirring was continued for 4 to 6 hours and the strong acid solution was then poured into water (250 mls.) containing cuprous chloride (0.15 g.) as hydrolysis catalyst. The diluted solution was boiled under reflux for 3 hours and hydrolysis products (cresols and iodotoluenes) were extracted by ether followed by caustic alkali extraction to separate cresols from iodotoluenes. The composition of the iodotoluene extract was 19% ortho-iodotoluene plus 81% para-iodotoluene (±2% in each case) and the composition of the cresol extract was 7.5% ortho-cresol plus 92.5% para-cresol (±2% in each case). The recovery of cresols was 80% of theoretical based on reacted iodotoluenes and the recovery of iodotoluenes was 78% based on reacted iodotoluenes although repeated runs gave varying yields within the range 60 to 90% recovery.

The recovered iodotoluene fraction was made up to original bulk by a mixture of ortho- and para-iodotoluenes containing 70% para-isomer and the reaction sequence was repeated. The composition of the subsequently recovered iodotoluene fraction was 20% ortho-isomer plus 80% para-isomer (±2% in each case) and the composition and yield of cresol fraction were the same as those for the cresol fraction from the initial run.

This example demonstrated the absence of unforeseen impediments to free recycle of recovered iodotoluene fractions and confirmed that meaningful inferences on the effect of recycling recovered iodotoluene fractions containing differing proportions of ortho and para isomers can be made on the basis of the results plotted in graphs I and II.

What we claim is:

1. A multi-step cyclical process for preparing p-cresol which comprises the steps of:
    (a) treating a feed mixture of o- and p-iodotoluene containing less than 80% of p-iodotoluene with a peroxide to oxidize it to the corresponding iodoso derivative,
    (b) condensing the iodosotoluene so produced with toluene in the presence of a strong acid to form a ditolyl iodonium salt, the anion derived from the acid being weakly nucleophilic,
    (c) hydrolyzing the iodonium cation of said salt by diluting the solution with water and heating it with a hydrolysis catalyst, so as to regenerate iodotoluene and produce a cresol fraction,
    (d) recovering said regenerated iodotoluene and recycling it by using it as a feed material in step (a),
    (e) repeatedly recovering and so recycling said regenerated iodotoluene until the reaction system attains a steady state in which the ratio of p- and o-iodotoluenes in the regenerated iodotoluene remains essentially constant, and
    (f) isolating p-cresol from the cresol fraction produced by said steady state operation.

2. A process as claimed in claim 1, wherein the steady state proportion of p-iodotoluene in the regenerated iodotoluene exceeds 65%.

3. A process as claimed in claim 2, wherein the bulk of recycled iodotoluene is maintained by addition of a mixture of o- and p-iodotoluenes containing from 50 to 80% of p-iodotoluene.

4. A process as claimed in claim 3, wherein the steady state proportion of p-iodotoluene in the regenerated iodotoluene is between 65 and 75%.

References Cited

Caserio et al.: J.A.C.S., 81, pp. 336–41 (1959).
Beringer et al.: J.A.C.S., 75, pp. 2705–8 (1953).
Collette et al.: J.A.C.S. 78, pp. 3819–20 (1956).

LEON ZITVER, Primary Examiner

N. P. MORGENSTERN, Assistant Examiner

U.S. Cl. X.R.

260—350